United States Patent
Chatziioannou

(10) Patent No.: US 11,990,773 B2
(45) Date of Patent: May 21, 2024

(54) LOCATION AWARENESS, POSITIONING AND/OR GUIDANCE FOR WIRELESS CHARGING

(71) Applicant: Volvo Car Corporation, Gothenburg (SE)

(72) Inventor: Konstantinos Chatziioannou, Öjersjö (SE)

(73) Assignee: VOLVO CAR CORPORATION, Gothenburg (SE)

( * ) Notice: Subject to any disclaimer, the term of this patent is extended or adjusted under 35 U.S.C. 154(b) by 182 days.

(21) Appl. No.: 17/531,261

(22) Filed: Nov. 19, 2021

(65) Prior Publication Data
US 2023/0163643 A1    May 25, 2023

(51) Int. Cl.
*B60L 53/38* (2019.01)
*B60L 53/126* (2019.01)
(Continued)

(52) U.S. Cl.
CPC ............ *H02J 50/90* (2016.02); *B60L 53/126* (2019.02); *B60L 53/38* (2019.02); *H02J 50/10* (2016.02);
(Continued)

(58) Field of Classification Search
CPC ........ Y02T 90/16; H04W 4/02; H04W 4/023; B60L 53/36; B60L 53/38; B60L 53/39;
(Continued)

(56) References Cited

U.S. PATENT DOCUMENTS 9,114,720 B2    8/2015 Oman et al.
9,582,748 B2    2/2017 Proud et al.
(Continued)

FOREIGN PATENT DOCUMENTS

CN    111463913 A    7/2020
CN    212304891 U    1/2021
(Continued)

OTHER PUBLICATIONS

M. Tiemann, B. Schmuelling and M. Clemens, "Control Signaling in Wireless Power Transfer for Electric Vehicles through Ultra-Wideband," 2019 Fourteenth International Conference on Ecological Vehicles and Renewable Energies, Monte-Carlo, Monaco, 2019, pp. 1-5, doi: 10.1109/EVER.2019.8813515 (Year: 2019).*

(Continued)

*Primary Examiner* — Cuong H Nguyen
(74) *Attorney, Agent, or Firm* — Amin, Turocy & Watson, LLP

(57) ABSTRACT

In one or more embodiments described herein, devices, systems, methods and/or apparatuses are described that can facilitate locational awareness and/or guidance of an inductive charging element relative to a target charging station. A device can comprise an inductive charging element, a signal component located relative to the inductive charging element for common movement with the inducting charging element, wherein the signal component transmits or receives a signal from a target position, and a controller that determines a distance between the inductive charging element and the target position based on a time measurement of the signal. The time measurement can include a time of arrival measurement and/or a time of flight measurement. The signal component can be an ultrawideband antenna, laser doppler device, acoustic device, electromagnetic device and/or other transmitter and/or receiver.

20 Claims, 10 Drawing Sheets

(51) Int. Cl.
　　*H02J 50/10*　　(2016.01)
　　*H02J 50/20*　　(2016.01)
　　*H02J 50/80*　　(2016.01)
　　*H02J 50/90*　　(2016.01)
　　*H04W 4/02*　　(2018.01)
　　*H04W 4/48*　　(2018.01)

(52) U.S. Cl.
　　CPC .............. *H02J 50/20* (2016.02); *H02J 50/80* (2016.02); *H04W 4/023* (2013.01); *H04W 4/48* (2018.02)

(58) Field of Classification Search
　　CPC ........ B60L 53/12; B60L 53/126; B60L 53/66; H02J 50/90; H02J 50/10
　　USPC ......................................... 320/108, 104, 109
　　See application file for complete search history.

(56) References Cited

U.S. PATENT DOCUMENTS

| | | |
|---|---|---|
| 9,941,708 B2 | 4/2018 | Keeling et al. |
| 10,029,577 B2 | 7/2018 | Widmer et al. |
| 10,139,238 B2 | 11/2018 | Widmer et al. |
| 10,340,752 B2 | 7/2019 | Widmer et al. |
| 10,411,524 B2 | 9/2019 | Widmer et al. |
| 10,419,655 B2 | 9/2019 | Sivan |
| 10,578,676 B2 | 3/2020 | Neubecker et al. |
| 10,737,709 B2 | 8/2020 | Carlson et al. |
| 10,814,736 B2 | 10/2020 | Van Wiemeersch et al. |
| 2017/0174093 A1* | 6/2017 | Oettle ..................... B60L 53/38 |
| 2019/0154439 A1 | 5/2019 | Binder |
| 2019/0162792 A1 | 5/2019 | Neubecker et al. |
| 2019/0184841 A1* | 6/2019 | Van Wiemeersch .... B60L 53/38 |
| 2019/0271549 A1* | 9/2019 | Zhang .................. G05D 1/0246 |
| 2021/0136842 A1* | 5/2021 | Jang ........................ B60L 53/66 |

FOREIGN PATENT DOCUMENTS

| | | | |
|---|---|---|---|
| CN | 110562455 B | | 4/2021 |
| KR | 20170044905 A | * | 4/2017 ............. Y02T 90/16 |

OTHER PUBLICATIONS

W. Ni et al., "Radio Alignment for Inductive Charging of Electric Vehicles," in IEEE Transactions on Industrial Informatics, vol. 11, No. 2, pp. 427-440, Apr. 2015, doi: 10.1109/TII.2015.2400925 (Year: 2015).*

KR 20170044905 A by Seung (English version from Google Patents) (Year: 2017).*

Lanzisera et al. "Radio Frequency Time-of-Flight Distance Measurement for Low-Cost Wireless Sensor Localization" IEEE Sensors Journal, vol. 11, No. 3, Mar. 2011. (9 pages).

Giovanelli et al., RSSI or Time-of-flight for Bluetooth Low Energy based localization? An experimental evaluation. 11th IFIP Wireless and Mobile Networking Conference (WMNC 2018), Sep. 2018, Prague, Czech Republic. pp. 32-39. hal-01995171.

Liu et al., "Distance Measurement Model Based on RSSI in WSN" Wireless Sensor Network, 2010, 2, 606-611. doi:10.4236/wsn.2010.28072 Published Online Aug. 2010 (http://www.SciRP.org/journal/wsn).

* cited by examiner

LOCATION AWARENESS, POSITIONING AND/OR GUIDANCE FOR WIRELESS CHARGING

BACKGROUND

A guidance control system can be employed as a part of a wireless charging system, such as for locating an inductive charging element relative to a target position. The target position can comprise a compatible inductive charging assembly. Existing technologies lack precision, accuracy and/or uninterrupted connection relative to different distance ranges of an inductive charging element from a compatible inductive charging assembly. This can be an issue where precise alignment between the inductive charging element and compatible inductive charging assembly can be employed for maximum charging efficiency and/or minimum charging time.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, methods and/or apparatuses are described that can facilitate location awareness, positioning and/or guidance for wireless charging, such as for wireless charging of a movable and/or driven object.

As used herein, the terms "entity", "requesting entity" and "user entity" can refer to a machine, device, component, hardware, software, smart device and/or human.

According to one embodiment, a device can comprise an inductive charging element, a signal component located relative to the inductive charging element for common movement with the inducting charging element, wherein the signal component transmits or receives a signal from a target position, and a controller that determines a distance between the inductive charging element and the target position based on a time measurement of the signal.

According to another embodiment, a method can comprise transmitting or receiving a signal by a signal component, by a system operatively coupled to a processor, wherein an inductive charging element is located relative to the signal component for common movement with the signal component, and determining, by the system, a distance between the inductive charging element and a target position based on a time measurement of the signal.

According to yet another embodiment, a system can comprise a vehicle comprising an inductive charging element, a signal component located relative to the inductive charging element for common movement with the inducting charging element, wherein the signal component transmits or receives a signal from a target position, and a controller that determines a distance between the inductive charging element and the target position based on a time measurement of the signal.

In one or more embodiments of the device, method and/or system, the signal component can transmit a wake signal to the target position.

In one or more embodiments of the device, method and/or system, the time measurement can be a time of arrival measurement.

In one or more embodiments of the device, method and/or system, the time measurement can be a time of flight measurement.

In one or more embodiments of the device, method and/or system, the signal component can be an ultrawideband antenna.

DESCRIPTION OF THE DRAWINGS

One or more exemplary embodiments are described below in the Detailed Description section with reference to the following drawings.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

While one or more devices and/or systems are described below with reference to a wheeled vehicle, such as an automobile, the one or more embodiments described herein are not limited to this use. A haptic and steering control system described herein can be implemented with any suitable electronic system such as, for instance, an electric driveline of an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a wireless charging system and/or guidance control system. Further, the one or more operations, techniques, systems, devices, apparatuses and/or methods discussed herein can be applicable to positioning for other purposes, such as for parking alignment, with or without relation to a wireless charging system.

Turning now to the figures, one or more embodiments described herein can include one or more devices, systems, apparatuses and/or system-implemented methods that can facilitate positioning of an inductive charging element, such as of a vehicle, relative to a target position, such as having an inductive charging assembly, such as including a ground assembly coil.

Figure 1:
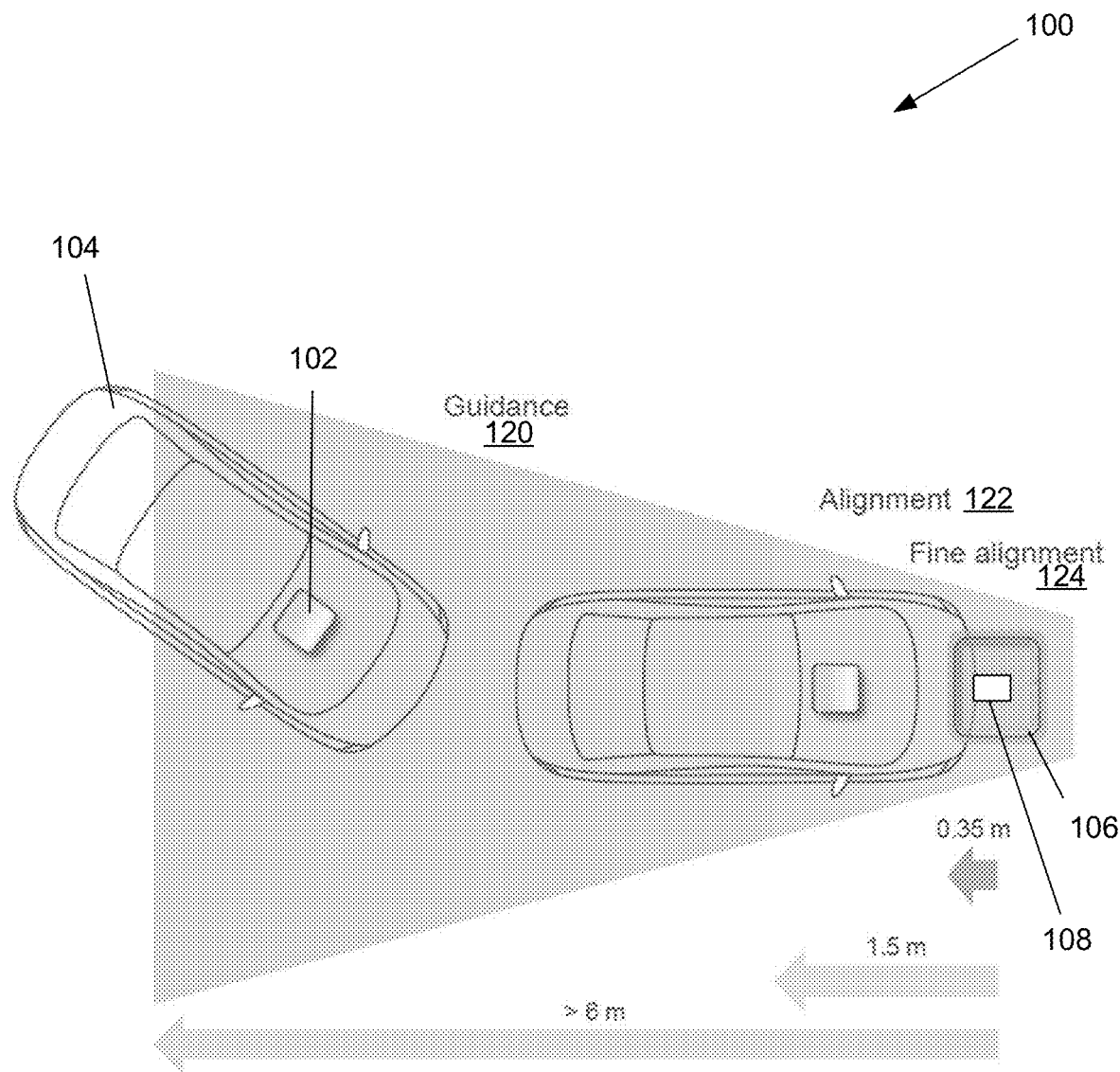
FIG. 1 illustrates a schematic diagram of a wireless charging positioning system, in accordance with one or more embodiments described herein.

Looking first to FIG. 1, illustrated is a wireless charging system 100. Depicted are different ranges where one or more different methods can be employed to guide a moving object relative to a static object. That is, depicted is an inductive charging element 102, such as being jointly movable with a vehicle 104, towards and into charging range with a target position 106. The target position 106 can comprise an inductive charging assembly 108, such as having a ground assembly coil. Positioning between the inductive charging element 102 and the inductive charging assembly 108 is to be within tolerance limits that can be relatively small, such as in terms of single digit inches or centimeters. One or more of these tolerance limits can be guided by and/or provided by one or more standards for wireless charging in one or more industries.

The different ranges depicted can comprise an initial guidance range 120, where the moving object having the inductive charging element 102 is guided and moved, such as from an outer limit of about 6 m to about 10 m to an inner limit of about 3 m to about 1 m. In one embodiment, the initial guidance range 120 can be from about 10 m to about 1.5 m, or from about 6 m to about 1.5 m. The next range, the alignment range 122, can abut the initial guidance range 120. The alignment range 122 can have an outer limit of about 3 m to about 1 m to an inner limit of about 0.5 m to about 0.3 m. Another range, the fine alignment range 124, can abut the alignment range 122 The fine alignment range 124 can have an outer limit of about 0.5 m to about 0.3 m to an inner limit of about 0.3 m to about 0 m. At 0 m, a point at the inductive charging element 102 can be perfectively vertically aligned with, such as aligned above, a point at the inductive charging assembly 108 of the target position 106.

Figure 2:
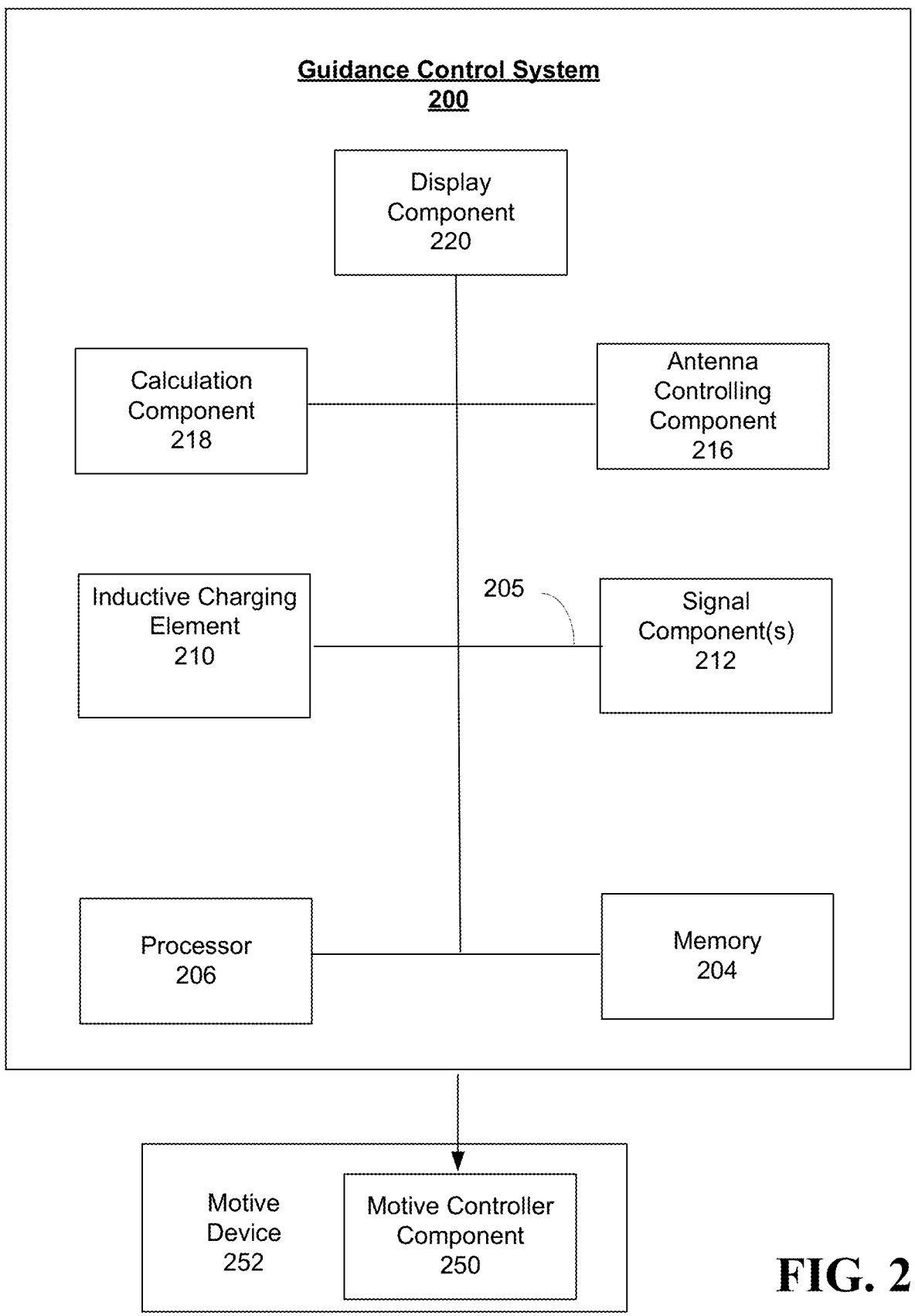
FIG. 2 illustrates a block diagram of a guidance control system, in accordance with one or more embodiments described herein.

Turning now to FIG. 2, a schematic diagram of a non-limiting system 200 (e.g., guidance control system 200) is illustrated. The guidance control system 200 can be used at the wireless charging systems 100, 300 or 400. Repetitive description of like elements employed in other embodiments described herein is omitted for sake of brevity.

The guidance control system 200 can comprise a processor 206, a memory 204, a bus 205, an inductive charging element 210, one or more signal components 212, an antenna controlling component 216 (e.g., such as a phone-as-key device), a calculation component 218 and/or a display component 220.

In one or more embodiments, the guidance control system 200 can be coupled (e.g., communicatively, electrically, operatively, optically, etc.) to one or more external systems, sources, and/or devices (e.g., classical and/or quantum computing devices, communication devices, etc.) via a network, such as of a movable object, such as a vehicle. The network can comprise one or more wired and/or wireless networks, including, but not limited to, a cellular network, a wide area network (WAN) (e.g., the Internet), and/or a local area network (LAN). For example, the guidance control system 200 can communicate, such as via the processor 206, with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, the guidance control system 200 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between the guidance control system 200 and external systems, sources, and/or devices (e.g., computing devices, communication devices, etc.).

Processor 206 can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor 206 can perform various operations that can be specified by such computer and/or machine readable, writable, and/or executable components and/or instructions including, but not limited to, logic, control, input/output (I/O), arithmetic, and/or the like. The processor 206 can comprise one or more central processing unit (CPU), multi-core processor, microprocessor, dual microprocessors, microcontroller, System on a Chip (SOC), array processor, vector processor, quantum processor, and/or another type of processor. Such examples of the processor can be employed to implement any embodiments described herein.

In an example embodiment, the processor 206 can comprise a central processing unit (CPU) such as, for example, a microprocessor. In some embodiments, processor 206 can comprise and/or employ one or more machine learning (ML) and/or artificial intelligence (AI) models to learn, for instance, one or more operating conditions and/or cause and effect conditions corresponding to the device and/or an external device coupled to the device. In these embodiments, based on learning such one or more operating conditions and/or cause and effect conditions, the processor 206 further can employ the one or more ML and/or AI models to perform one or more tasks including, but not limited to, making a prediction, making an estimation, classifying data, implementing one or more monitoring and/or control operations of the inductive charging element 210, one or more signal components 212, antenna controlling component 216, calculation component 218 and/or display component 220, and/or another task. In one or more embodiments, the processor 206 can comprise one or more of the inductive charging element 210, one or more signal components 212, antenna controlling component 216, calculation component 218 and/or display component 220.

The memory 204 can store one or more computer and/or machine readable, writable, and/or executable components and/or instructions that, when executed by the processor 206 (e.g., a classical processor, a quantum processor, etc.), can facilitate performance of operations defined by the executable component(s) and/or instruction(s). For example, the memory 204 can store computer and/or machine readable, writable, and/or executable components and/or instructions that, when executed by the processor, can facilitate execution of the various functions described herein relating to the inductive charging element 210, one or more signal components 212, antenna controlling component 216, calculation component 218 and/or display component 220. For instance, the memory 204 can store computer and/or machine readable, writable, and/or executable components and/or instructions that, when executed by the processor, can facilitate one or more of such parameter monitoring tasks described above and/or to facilitate logging of monitoring data collected by one or more sensors. In another example, memory 204 can store computer and/or machine readable, writable, and/or executable components and/or instructions that, when executed by the processor, can facilitate operation of one or more switches to configure the device to operate in one or more operation modes described herein.

The memory 204 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory 504 can be employed to implement any embodiments described herein.

Turning now to the other components of the guidance control system 200, further operation of the non-limiting system 200 will be described in detail.

The inductive charging element 210 can comprise any suitable component for allowing wireless charging of one or more batteries, capacitors and/or other power sources operatively couplable to the inductive charging element 210. The inductive charging element 210 can wirelessly couple to a ground assembly coil to provide the inductive charging.

The signal component 212 can be provided at a static position relative to the inductive charging element 210. That is, the signal component and the inductive charging element 210 can be jointly movable together to align the inductive charging element 210 relative to a target position. The signal component 212 can be any suitable transmitter, receiver and/or transmitter and receiver that can receive and/or transmit one or more signals to and/or from the target position. For example, a compatible signal component can be comprised by the target position for operating in conjunction with the signal component 212.

In one or more embodiments, a plurality of signal components can be fixedly disposed relative to the inductive charging element 210, such as to allow for triangulation relative to the target position. In one or more embodiments, a plurality of signal component can additional and/or alternatively be fixedly disposed relative to the compatible target position.

Receipt and/or transmission of one or more signals, such as RF signals, data signals, Bluetooth signals, electromagnetic signals, acoustic signals, optical signals, light and/or the like can be employed by the signal component 212 to provide distance data to the calculation component 218 for determining current distance between the inductive charging element 210 and the target position. That is, position of the signal component 212 from the inductive charging element 210 can be static and known, such as stored at a suitable lookup table accessible by the calculation component 218.

The calculation component 218 can comprise and/or have access to any suitable component, AI, learning model, algorithms, lookup tables, databases and/or the like for employing data, such as time measurement data and/or distance data received from the one or more signal components 212. The calculation component 218 can receive input from different sensors that can be available relative to the non-limiting system 200, such as at a vehicle or other apparatus comprising the non-limiting system 200. In one or more other embodiments, the calculation component 218 can combine different inputs from different sensors and/or signal components 212 to convert the data received and/or otherwise obtained into longitudinal data that can be used by an autonomous drive function and/or display interface to provide automatic parking and/or graphical user interface.

The display component 220 can provide a display, such as via a graphical user interface, to a user entity of the guidance control system 200. The display component 220 can generate a symbolic representation of the inductive charging element 210 and/or respective vehicle relative to the target position.

The antenna controlling component 216 can control one or more signal components 212, such as antennas, of the guidance control system 200 or of the respective target position. For example, an antenna controlling component 216, such as a phone-as-key device, can send a wake signal to a signal component at the target position when the guidance control system 200 and/or or a portion thereof is within a threshold range of the target position.

Any of the aforementioned components of the guidance control system 200 can be powered and/or charged by the operative connection of the inductive charging element 210 and a ground coil assembly at the target position.

As shown, the motive controller component 250 is separate from the guidance control system 200. In one or more other embodiments, the motive controller component 250 can be comprised by the guidance control system 200. The motive control component 250 can be comprised by and/or operatively coupled to a motive device 252 for moving the guidance control system 200, and/or a portion thereof, towards the target position. That is, the motive device 252 can provide for the joint movement of the inductive charging element 210 and one or more signal components 212.

The motive device 252 can be operated by the motive controller component 250 according to one or more signals received from one or more signal components 212 (e.g., as employed by the calculation component 218). In one or more embodiments, the one or more signal components 212 can transmit one or more signals, such as from the calculation component 218, to the motive controller component 250. In one or more other embodiments, one or more other means of transmission can be utilized between the calculation component 218 and the motive controller component 250.

The guidance control system 200 further can comprise one or more sensors, such as GPS, movement, gyroscopic, electromagnetic and/or optical sensors. In one or more embodiments, data from the one or more sensors can be employed by the calculation component 218 to provide current distance calculations to the processor 206 and/or display component 220.

Figure 3:
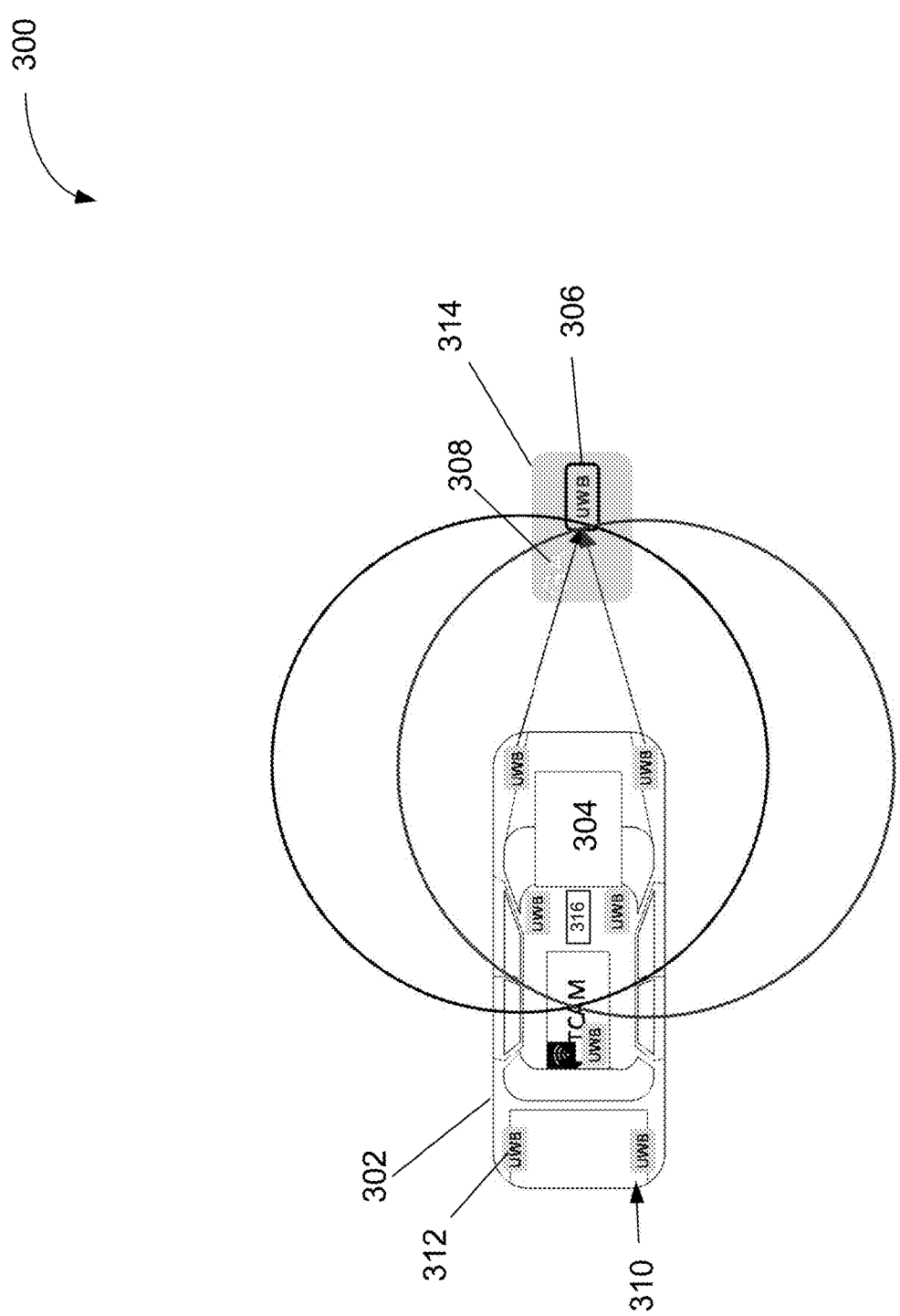
FIG. 3 illustrates a schematic diagram of another wireless charging positioning system, in accordance with one or more embodiments described herein.

At FIG. 3, a wireless charging system 300 is illustrated comprising a vehicle 302, inductive charging element 304, target position 306, ground coil assembly 308, guidance control system 310, a plurality of signal components 312 and a target position signal component 314. As illustrated, one or more, such as each, of the signal components 312 can be an ultrawideband (UWB) antenna or Bluetooth low energy antenna suitable for transmitting and/or receiving a signal, such as a Bluetooth low energy signal. Distance between the various signal components 312 can be fixed, such as known and/or retrievable by the respective calculation component of the guidance control system 310. That is, the various signal components 312 can be located for common movement with the inductive charging element 304 relative to the target position. The guidance control system 310 can be the non-limiting system 200, for example.

One or more antennas of the guidance control system 310 can be paired with a signal component 314 of the target position, such as a UWB antenna of the target position. The pairing can be by way of a Bluetooth low energy connection, WiFi and/or other suitable connection.

Two or more signal components 312 at the vehicle 302 can be employed to provide triangulation of the inductive charging element 304 relative to the signal component 314 of the target position, which also can be a suitable UWB antenna. In one or more embodiments, the one or more signal components 312 can transmit position data, such as raw data and/or calculated data (e.g., from a calculation component) to an antenna controlling component 316, such as a phone-as-key device, fixedly disposed relative to the one or more signal components 312, such as for common movement with the one or more signal components 312. In this way, one or more signals can be transmitted by the antenna controlling component 316 to the target position, such as to the target position signal component 314. In one or more embodiments, the antenna controlling component 316 and/or one or more signal components 312 can be configured to transmit a wake signal to the target position, such as upon being within a selectively determined distance range and/or meeting a selectively determined distance threshold from the target position. The threshold(s) and/or range(s) can be selected by a user entity, such as by a suitable display interface component of the guidance control system 310.

Figure 4:
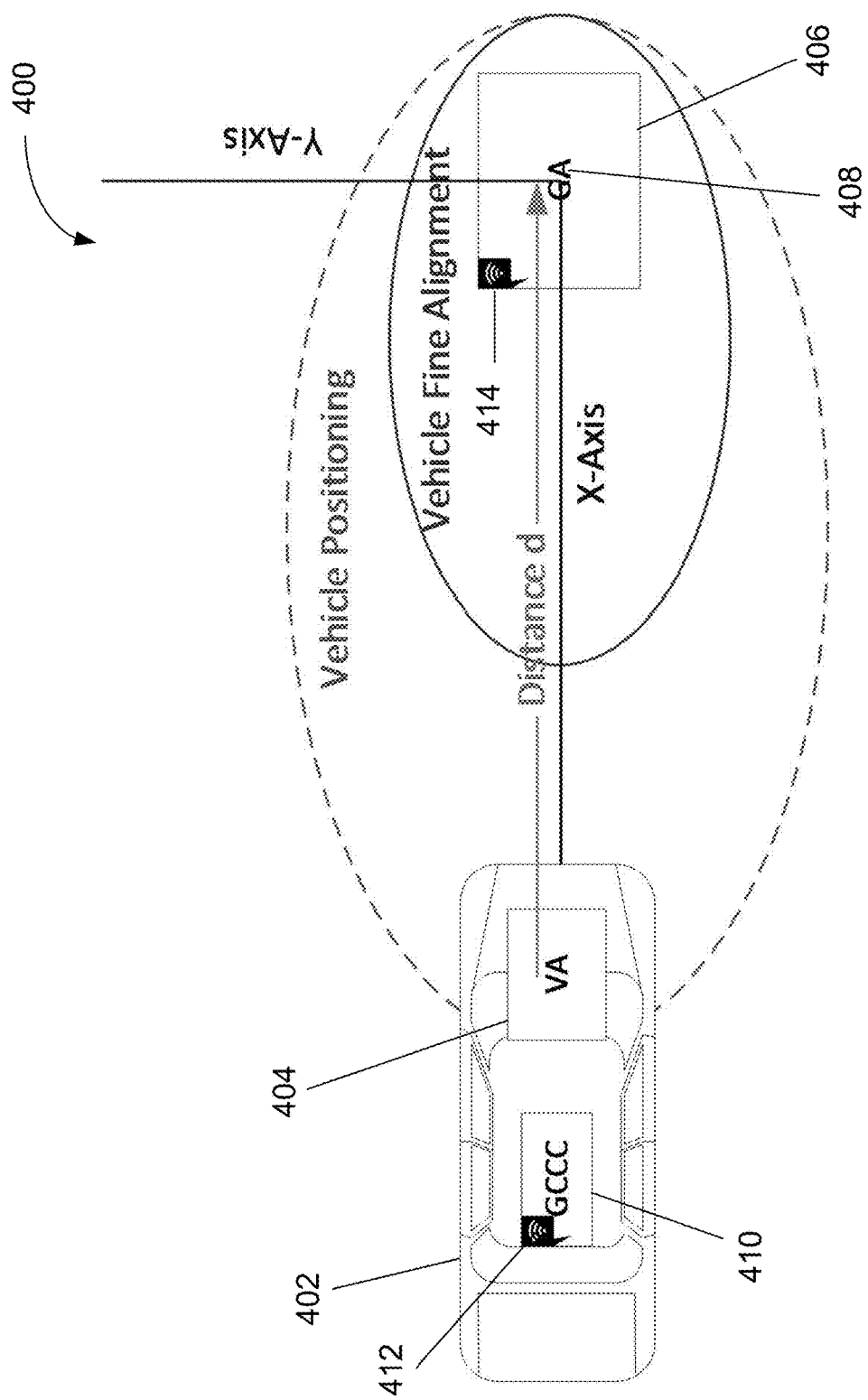
FIG. 4 illustrates another schematic diagram of the wireless charging positioning system of FIG. 3, in accordance with one or more embodiments described herein.

At FIG. 4, a wireless charging system 400 is illustrated comprising a vehicle 402, inductive charging element 404, target position 406, ground coil assembly 408, guidance control system 410, signal component 412 and/or target position signal component 414. In one or more embodiments, one or more additional signal components 412 can be comprised by the guidance control system 410 and/or wireless charging system 400.

Figure 5:
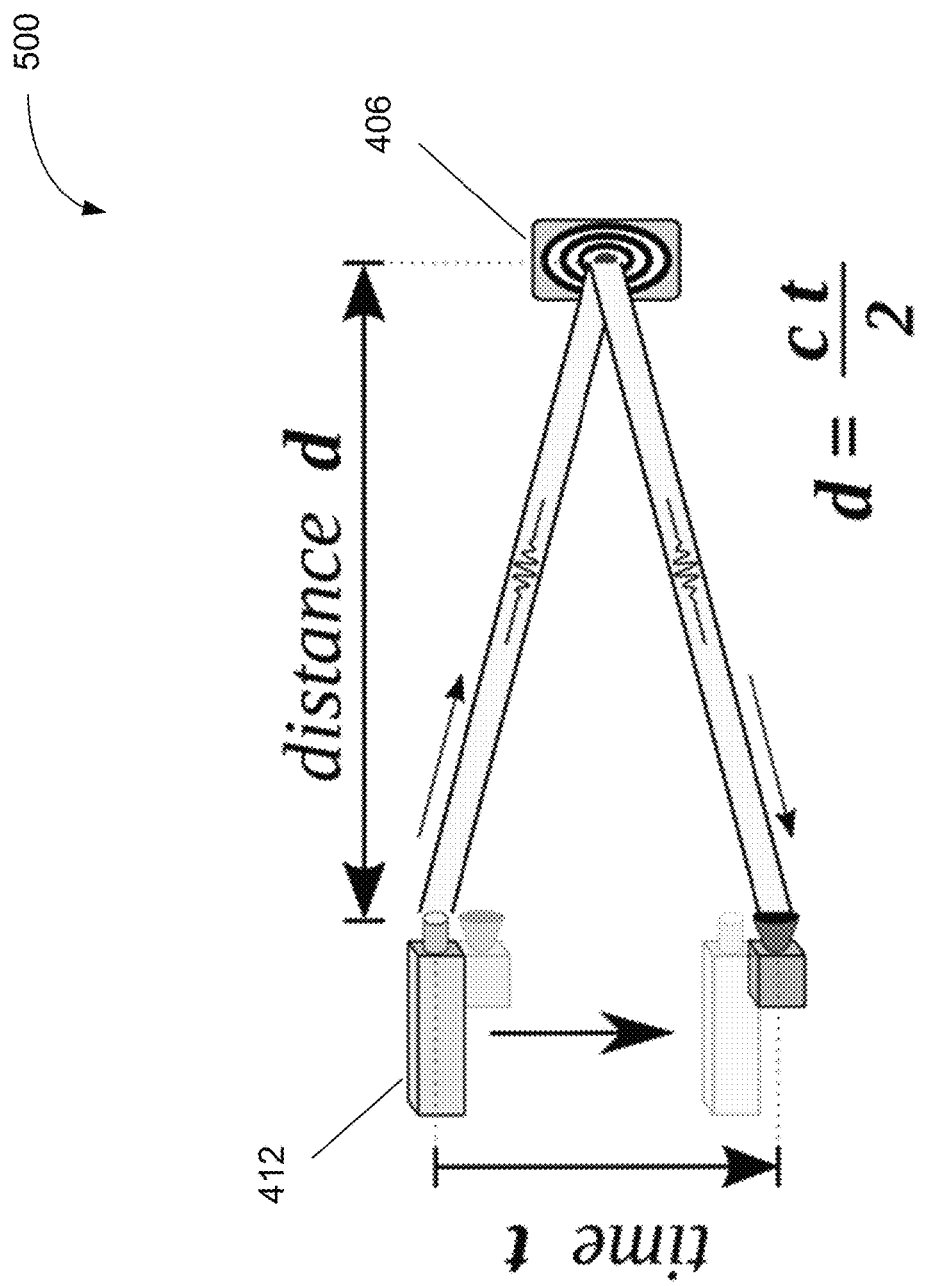
FIG. 5 illustrates a schematic diagram of an example, non-limiting system-implemented time measurement process that can be employed, in accordance with one or more embodiments described herein.
Figure 6:
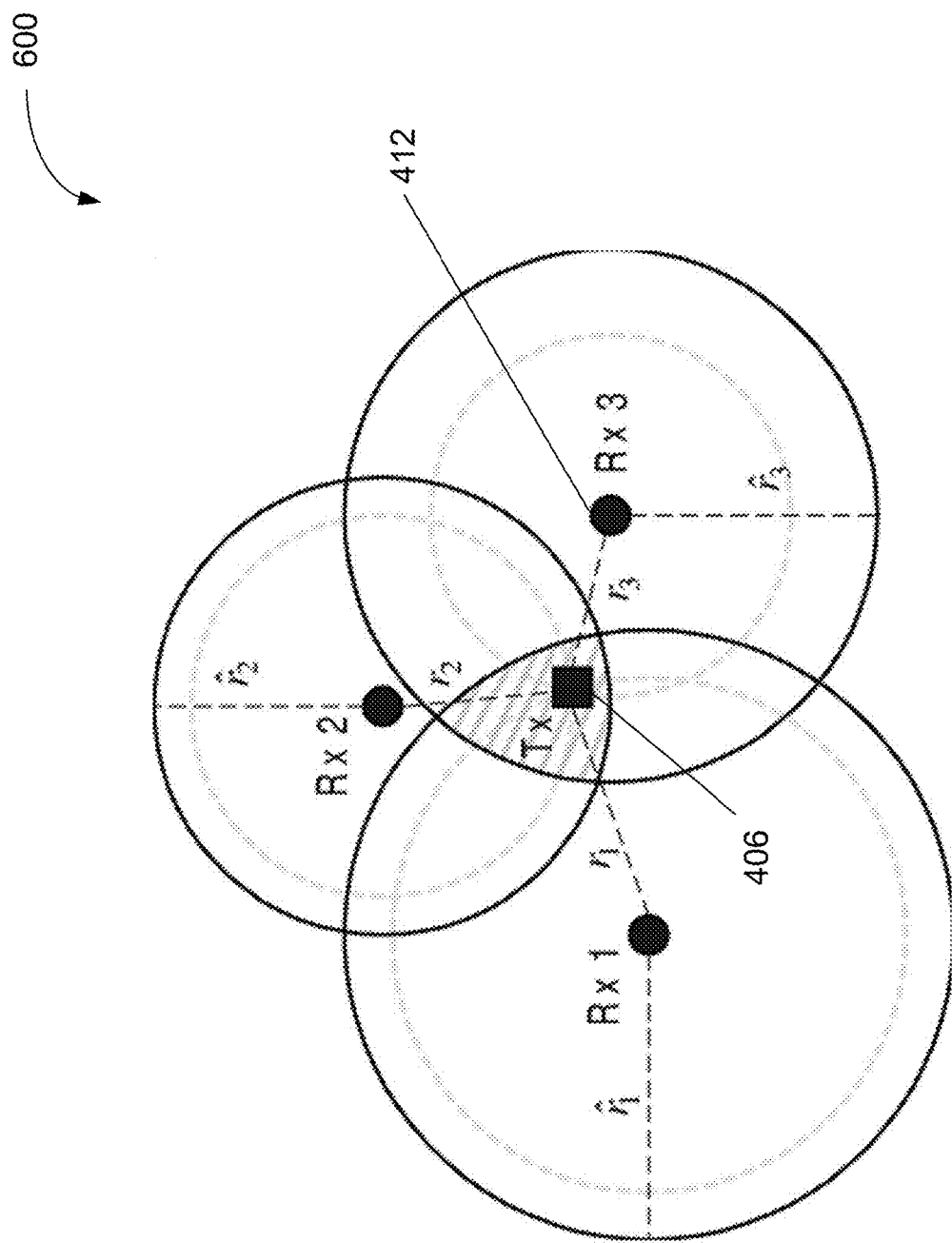
FIG. 6 illustrates a schematic diagram of another example, non-limiting system-implemented time measurement process that can be employed, in accordance with one or more embodiments described herein.

In connection with the FIGS. 5 and 6, the guidance control system 410 can comprise a suitable controller component and/or calculation component that can employ data received from the signal component 412 to determine a current distance between the inductive charging element 404 and the target position 406. For example, the calculation component can be comprised by a controller. The controller, such as employing any of any suitable component, AI, learning model, algorithms, lookup tables, databases and/or the like can determine a distance between the inductive charging element 404 and the target position 406 based on a time measurement of a signal from the signal component 412. In one or more embodiments, the time measurement can comprise a time of flight measurement (FIG. 5). In one or more embodiments, additionally and/or alternatively, the time measurement can comprise a time of arrival measurement (FIG. 6).

At FIG. 5, one method of time measurement data that can be employed by the wireless charging system 400 and/or non-limiting system 200 is depicted. The time measurement data can be time of arrival measurement data. Time of flight (ToF) is the measurement of the time taken by an object, particle or wave (be it acoustic, electromagnetic, etc.) to travel a distance through a medium. This information can then be used to measure velocity or path length, or as a way to learn about the particle or medium's properties (such as composition or flow rate). The traveling object may be detected directly (e.g., via an ion detector in mass spectrometry) or indirectly (e.g., by light scattered from an object in laser doppler velocimetry).

With reference to FIGS. 4 and 5 together, the signal component 412 can send a particle or wave, such as acoustic, electromagnetic, light and/or other optical signal towards the target position signal component 414, and/or vice versa. The particle or wave transmitted can take a certain time to travel a distance through a defined medium between the signal components 412 and 414. By signal received at the receiving signal component and/or reflected back at the transmitting signal component, time data can be determined. The time data can be employed, such as by a suitable controller and/or calculation component, such as of the guidance control system 410, to determine a current distance between the two signal components. Using the distance between the target position signal component 414 and the ground coil assembly 408 and the distance between the signal component 412 and the inductive charging element 442, a distance between the ground coil assembly 408 and the inductive charging element 404 can be determined.

At FIG. 6, another method of time measurement data that can be employed by the wireless charging system 400 and/or non-limiting system 200 is depicted. The time measurement data can be time of flight measurement data. Time of arrival (TOA or ToA) is the absolute time instant when a radio signal emanating from a transmitter reaches a remote receiver. The time span elapsed since the time of transmission (TOT or ToT) is the time of flight (TOF or ToF). Time difference of arrival (TDOA) is the difference between TOAs.

With reference to FIGS. 4 and 6 together, the signal component 412 can sent a signal, such as a radio signal, towards the target position signal component 414, and/or vice versa. The RF signal can take a certain time to travel between the signal components 412, 414. Using the distance between the target position signal component 414 and the ground coil assembly 408 and the distance between the signal component 412 and the inductive charging element 404, a distance between the ground coil assembly 408 and the inductive charging element 404 can be determined.

Figure 7:
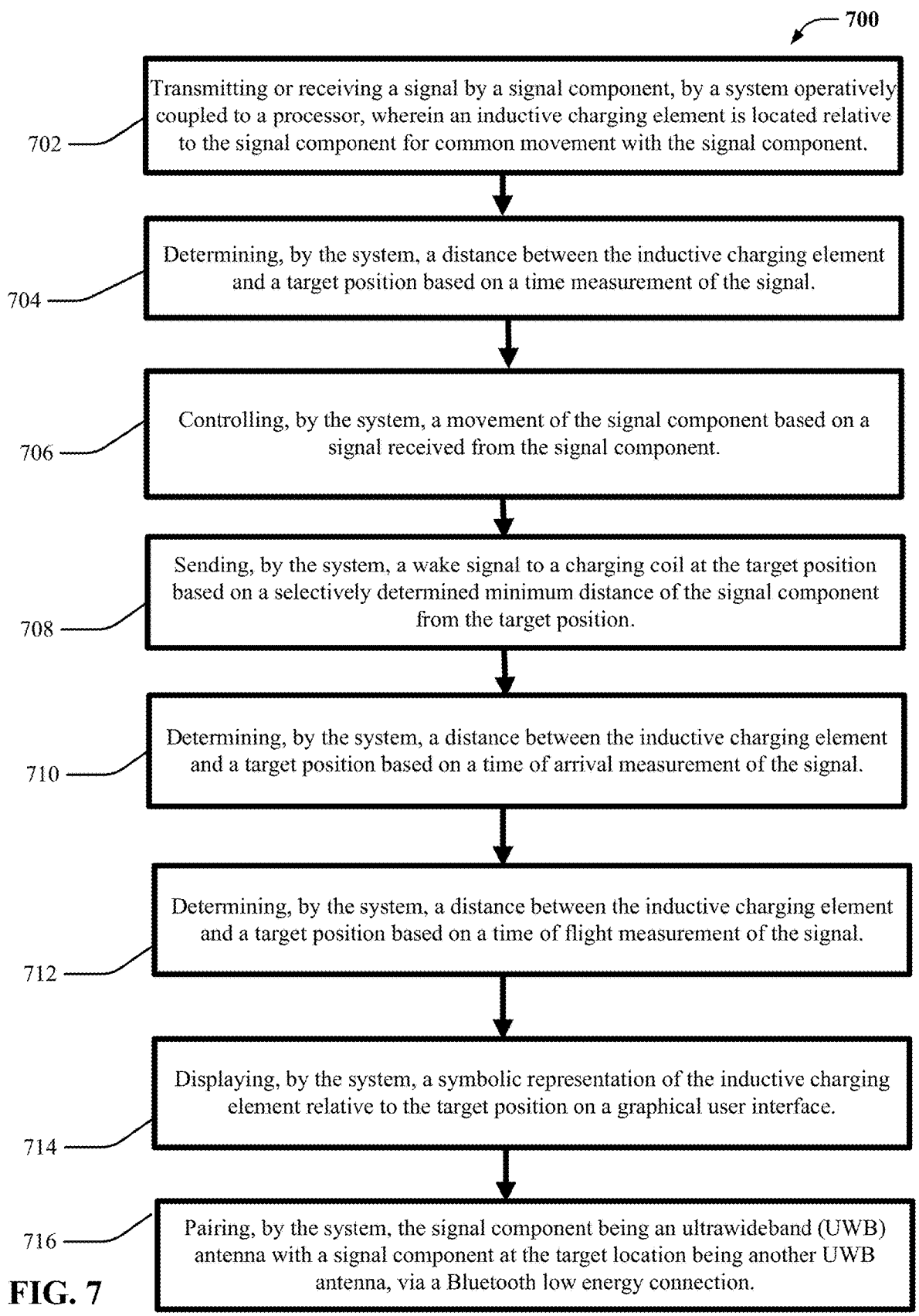
FIG. 7 illustrates a block diagram of an example, non-limiting system-implemented method for guidance relative to a target position, in accordance with one or more embodiments described herein.

Turning now to FIG. 7, illustrated is a flow diagram of an example, non-limiting system-implemented and/or computer-implemented method 700 that can facilitate location awareness and/or guidance, in accordance with one or more embodiments described herein. While the non-limiting method 700 is described with reference to the non-limiting system 200, the non-limiting method 700 likewise can apply to the non-limiting system 300. Repetitive description of like elements employed in other embodiments described herein is omitted for sake of brevity.

At 702, the system- and/or computer-implemented method 700 can comprise transmitting or receiving a signal by a signal component, by a system (e.g., non-limiting system 200) operatively coupled to a processor, wherein an inductive charging element is located relative to the signal component for common movement with the signal component.

At 704, the system- and/or computer-implemented method 700 can comprise determining, by the system (e.g., non-limiting system 200), a distance between the inductive charging element and a target position based on a time measurement of the signal.

At 706, the system- and/or computer-implemented method 700 can comprise controlling, by the system (e.g., non-limiting system 200), a movement of the signal component based on a signal received from the signal component.

At 708, the system- and/or computer-implemented method 700 can comprise sending, by the system (e.g., non-limiting system 200), a wake signal to a charging coil at the target position based on a selectively determined minimum distance of the signal component from the target position.

At 710, the system- and/or computer-implemented method 700 can comprise determining, by the system (e.g., non-limiting system 200), a distance between the inductive charging element and a target position based on a time of arrival measurement of the signal.

At 712, the system- and/or computer-implemented method 700 can comprise determining, by the system (e.g., non-limiting system 200), a distance between the inductive charging element and a target position based on a time of flight measurement of the signal.

At 714, the system- and/or computer-implemented method 700 can comprise displaying, by the system (e.g., non-limiting system 200), a symbolic representation of the inductive charging element relative to the target position on a graphical user interface.

At 716, the system- and/or computer-implemented method 700 can comprise pairing, by the system (e.g., non-limiting system 200), the signal component being an ultrawideband (UWB) antenna with a signal component at the target location being another UWB antenna, via a Bluetooth low energy connection.

Turning now to any of the one or more embodiments discussed above with reference to any one or more of FIGS. 1 to 7, in view of the aforementioned descriptions, the one or more embodiments described herein are summarized.

In summary, one or more embodiments described herein, can comprise one or more devices, systems, methods and/or apparatuses that can facilitate locational awareness and/or guidance of an inductive charging element relative to a target charging station. A device can comprise an inductive charging element, a signal component located relative to the inductive charging element for common movement with the inducting charging element, wherein the signal component transmits or receives a signal from a target position, and a controller that determines a distance between the inductive charging element and the target position based on a time measurement of the signal. The time measurement can include a time of arrival measurement and/or a time of flight measurement. The signal component can be an ultrawideband antenna, laser doppler device, acoustic device, electromagnetic device and/or other transmitter and/or receiver.

One or more advantages of the one or more embodiments described herein can be lower cost of components and/or fabrication than existing radar based solutions. The one or more embodiments described herein can mitigate one or more effects of interference and/or fading that are present in existing received signal strength indicator (RSSI) radar based techniques. The one or more systems described herein also can be non-affected by environmental conditions, as compared to existing techniques, such as camera-based techniques.

The one or more flowcharts and/or block diagrams in the Figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

Figure 8:
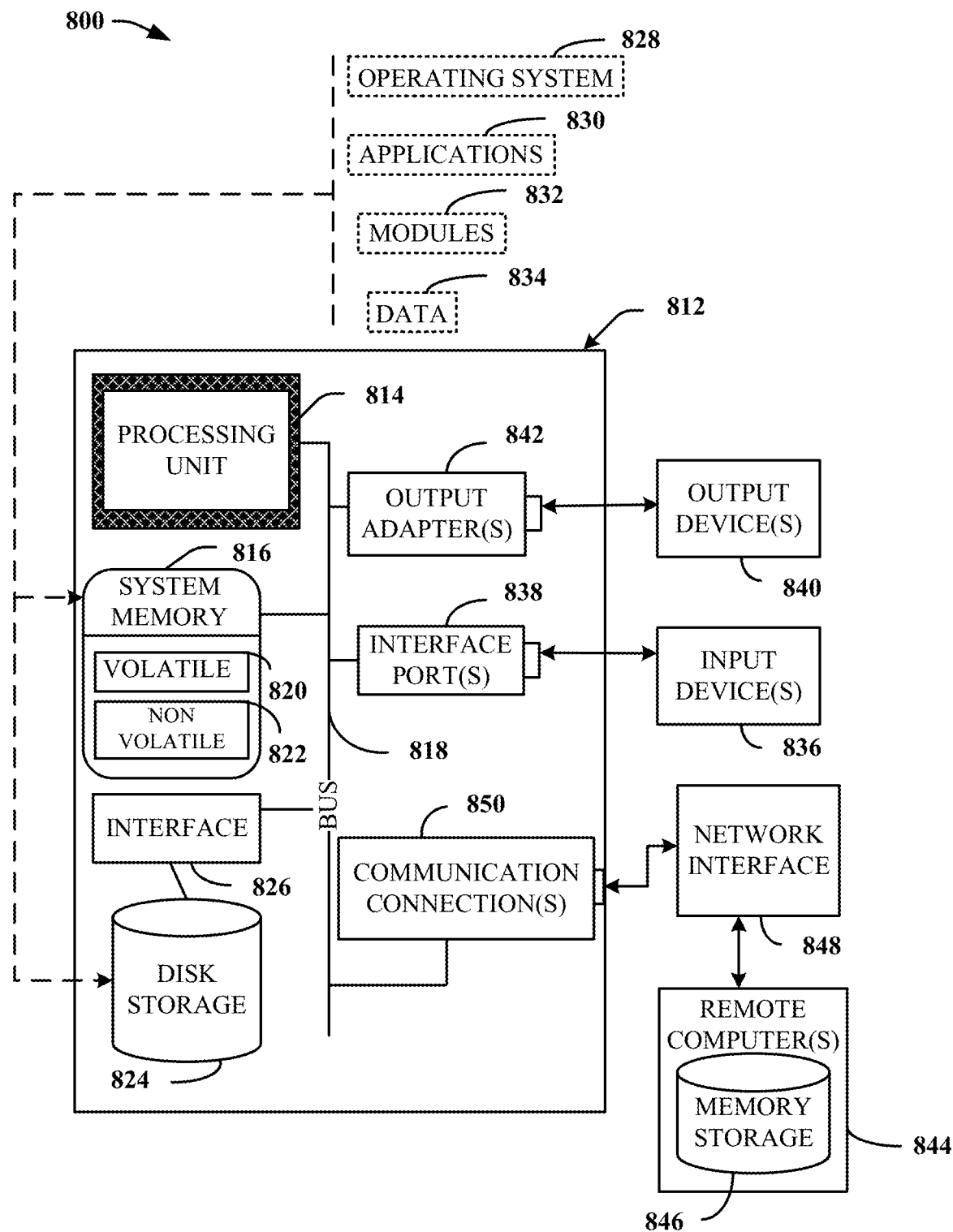
FIG. 8 illustrates a block diagram of an example, non-limiting operating environment, in which one or more embodiments described herein can be facilitated.

Next, in order to provide a context for the various aspects of the disclosed subject matter, FIG. 8 as well as the following discussion are intended to provide a general description of a suitable environment in which the various aspects of the disclosed subject matter can be implemented. FIG. 8 illustrates a suitable operating environment 800 for implementing various aspects described herein, which suitable operating environment 800 can include a computer 812. The computer 812 can also include a processing unit 814, a system memory 816 and a system bus 818. The system bus 818 can couple system components including, but not limited to, the system memory 816 to the processing unit 814. The processing unit 814 can be any of various available processors. Dual microprocessors and other multiprocessor architectures also can be employed as the processing unit 814. The system bus 818 can be any one or more types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1074), and Small Computer Systems Interface (SCSI). The system memory 816 can also include volatile memory 820 and/or nonvolatile memory 822. The basic input/output system (BIOS), containing the basic routines to transfer information between elements within the computer 812, such as during start-up, can be stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM can be available in one or more forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM.

Computer 812 can also include removable/non-removable, volatile/non-volatile computer storage media. FIG. 8 illustrates, for example, a disk storage 824. Disk storage 824 can include, but is not limited to, devices like a magnetic disk drive, floppy disk drive, tape drive, Jaz drive, Zip drive, LS-100 drive, flash memory card and/or memory stick. The disk storage 824 can include storage media separately and/or in combination with other storage media including, but not limited to, an optical disk drive such as a compact disk ROM device (CD-ROM), CD recordable drive (CD-R Drive), CD rewritable drive (CD-RW Drive) and/or a digital versatile disk ROM drive (DVD-ROM). To facilitate connection of the disk storage 824 to the system bus 818, a removable or non-removable interface is typically used, such as interface 826.

FIG. 8 also depicts software that can act as an intermediary between users and the basic computer resources described in the suitable operating environment 800. Such software can include, for example, an operating system 828. Operating system 828, which can be stored on disk storage 824, can act to control and allocate resources of the computer 812. System applications 830 can take advantage of the management of resources by operating system 828 through program modules 832 and/or program data 834, e.g., stored in system memory 816 and/or on disk storage 824. One or more embodiments described herein can be implemented with various operating systems and/or combinations of operating systems.

A user can enter commands or information into the computer 812 through input device(s) 836. Input devices 836 can include, but are not limited to, a pointing device such as a mouse, trackball, stylus, touch pad, keyboard, microphone, joystick, game pad, satellite dish, scanner, TV tuner card, digital camera, digital video camera, web camera and/or the like. These and/or other input devices can connect to the processing unit 814 through the system bus 818 via interface port(s) 838. Interface port(s) 838 can include, for example, a serial port, a parallel port, a game port and/or a universal serial bus (USB). Output device(s) 840 can use one or more of the same type of ports as input device(s) 836. For example, a USB port can be used to provide input to computer 812 and/or to output information from computer 812 to an output device 840. Output adapter 842 can be provided to illustrate that there are one or more output devices 840 like monitors, speakers and/or printers, among other output devices 840, which can require special adapters. The output adapters 842 can include, by way of illustration and not limitation, video and/or sound cards that can provide a means of connection between the output device 840 and the system bus 818. It can be noted that other devices and/or systems of devices can provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor-based appliance, a peer device and/or other common network node and/or the like, and/or typically can also include many of the elements described relative to computer 812. For purposes of brevity, only a memory storage device 846 is illustrated with remote computer(s) 844. Remote computer(s) 844 can be logically connected to computer 812 through a network interface 848 and then physically connected via communication connection 850. Network interface 848 encompasses wired and/or wireless communication networks such as local-area networks (LAN), wide-area networks (WAN), cellular networks and/or the like. LAN technologies include Fiber Distributed Data Interface (FDDI), Copper Distributed Data Interface (CDDI), Ethernet, Token Ring and/or the like. WAN technologies can include, but are not limited to, point-to-point links, circuit switching networks like Integrated Services Digital Networks (ISDN) and/or variations thereon, packet switching networks and/or Digital Subscriber Lines (DSL). Communication connection(s) 850 refers to the hardware/software that can be employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and/or external technologies such as, modems including regular telephone grade modems, cable modems and DSL modems, ISDN adapters and/or Ethernet cards.

Figure 9:
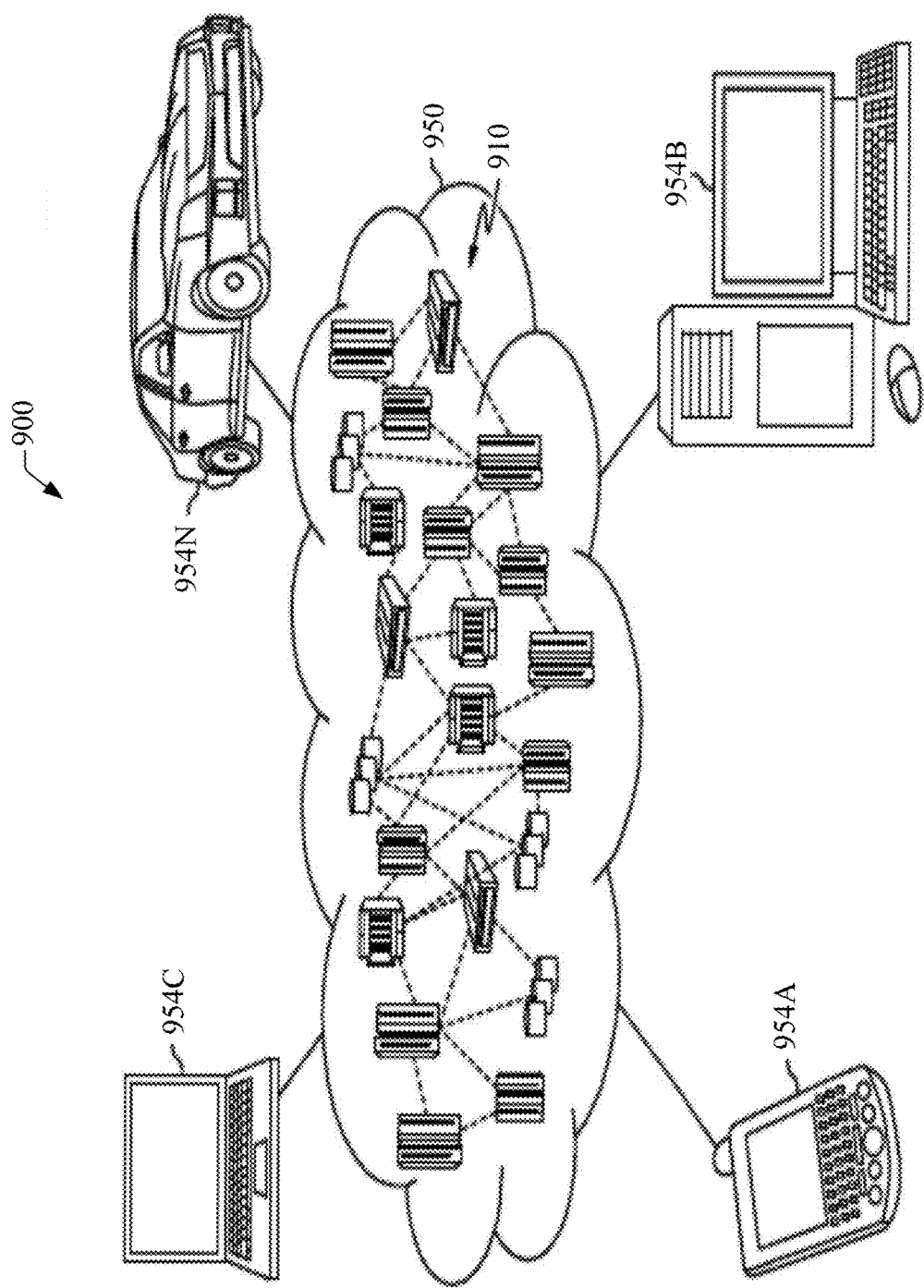
FIG. 9 illustrates a block diagram of an example, non-limiting cloud computing environment, in accordance with one or more embodiments described herein.
Figure 10:
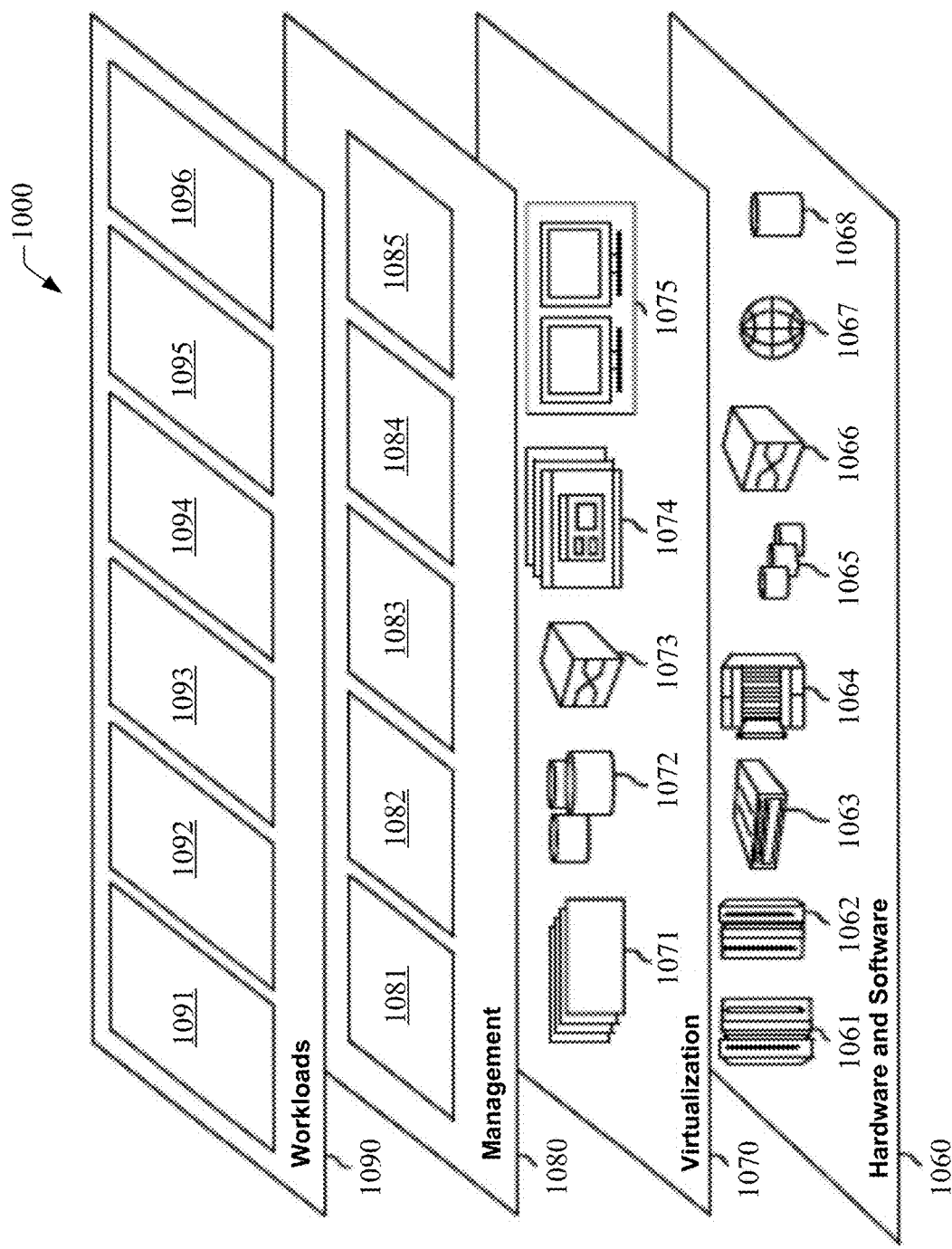
FIG. 10 illustrates a block diagram of a plurality of example, non-limiting abstraction model layers, in accordance with one or more embodiments described herein.

In one or more cases, the various embodiments of the non-limiting system 200 described herein can be associated with a cloud computing environment, such as a cloud computing environment 950 as is illustrated in FIG. 9 and/or with one or more functional abstraction layers described herein with reference to FIG. 10 (e.g., hardware and software layer 1060, virtualization layer 1080, management layer 1080 and/or workloads layer 1090).

It is to be understood that although a detailed description is provided herein on cloud computing, implementation of the teachings recited herein are not limited to a cloud computing environment. Rather, one or more embodiments described herein can be capable of being implemented in conjunction with any other type of computing environment now known or later developed.

Regarding cloud computing, cloud computing can be a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and/or at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that promote use by heterogeneous thin or thick client platforms (e.g., mobile phones, laptops, and PDAs).

Resource pooling: the provider's computing resources can be pooled to serve multiple consumers using a multi-tenant model, with different physical and virtual resources dynamically assigned and reassigned according to demand. There can be a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer can be to provision processing, storage, networks, and other fundamental computing resources where the consumer can deploy and run arbitrary software, which can include operating systems and applications. The consumer does not manage or control the underlying cloud infrastructure but can have control over operating systems, storage, deployed applications, and/or possibly limited control of select networking components (e.g., host firewalls).

Deployment Models can be as follows:

Private cloud: the cloud infrastructure can be operated solely for an organization. It can be managed by the organization and/or a third party and can exist on-premises and/or off-premises.

Community cloud: the cloud infrastructure can be shared by one or more organizations and can support a specific community that can have shared concerns (e.g., mission, security requirements, policy, and compliance considerations). The cloud infrastructure can be managed by the organizations and/or by a third party and/or can exist on-premises and/or off-premises.

Public cloud: the cloud infrastructure can be made available to the general public and/or to a large industry group and/or can be owned by an organization selling cloud services.

Hybrid cloud: the cloud infrastructure can be a composition of two or more clouds (private, community and/or public) that can remain as unique entities but can be bound together by standardized and/or proprietary technology that enables data and application portability (e.g., cloud bursting for load-balancing between clouds).

A cloud computing environment can be service oriented with a focus on statelessness, low coupling, modularity and/or semantic interoperability. At the heart of cloud computing can be an infrastructure that can include a network of interconnected nodes.

Referring now specifically to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or another quantum platform) with which local computing devices used by cloud consumers can communicate. Nodes 910 can communicate with one another. Nodes 910 can be grouped (not shown) physically and/or virtually, in one or more networks, such as Private, Community, Public and/or Hybrid clouds as described hereinabove, and/or a combination thereof. This grouping can allow cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and/or cloud computing environment 950 can communicate with any type of computerized device over any type of network and/or network addressable connection (e.g., using a web browser).

Referring next specifically to FIG. 10, a set of functional abstraction layers provided by cloud computing environment 950 (FIG. 9) is shown. It should be understood in advance that the components, layers and/or functions shown in FIG. 10 are intended to be illustrative only and that the one or more embodiments described herein are not limited thereto. As depicted, the following layers and/or corresponding functions are provided:

Hardware and software layer 1060 can include hardware and software components. Examples of hardware components can include: mainframes 1061; RISC (Reduced Instruction Set Computer) architecture based servers 1062; servers 1063; blade servers 1064; storage devices 1065; and/or networks and networking components 1066. In one or more embodiments, software components can include network application server software 1067, database software 1068, quantum platform routing software (not illustrated in FIG. 10), and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and operating systems 1074; and/or virtual clients 1075.

In one example, management layer 1080 can provide the functions described below. Resource provisioning 1081 can provide dynamic procurement of computing resources and/or other resources that can be utilized to perform tasks within the cloud computing environment. Metering and pricing 1082 can provide cost tracking as resources are utilized within the cloud computing environment, and/or billing and/or invoicing for consumption of these resources. In one example, these resources can include application software licenses. Security can provide identity verification for cloud consumers and tasks, as well as protection for data and other resources. User portal 1083 can provide access to the cloud computing environment for consumers and system administrators. Service level management 1084 can provide cloud computing resource allocation and management such that required service levels are met. Service Level Agreement (SLA) planning and fulfillment 1085 can pre-arrangement for, and procurement of, cloud computing resources for which a future requirement is anticipated in accordance with an SLA.

Workloads layer 1090 can provide one or more examples of functionality for which the cloud computing environment 950 (FIG. 9) can be utilized. Non-limiting examples of workloads and/or functions which can be provided from this layer can include: mapping and navigation 1091; software development and lifecycle management 1092; virtual classroom education delivery 1093; data analytics processing 1094; transaction processing 1095; and/or vulnerability risk assessment software 1096.

The one or more embodiments described herein can include on or more of a system, a method, an apparatus and/or a computer program product at any possible technical detail level of integration. The computer program product can include a computer readable storage medium (or media) having computer readable program instructions thereon for causing a processor to carry out one or more aspects of the one or more embodiment described herein. The computer readable storage medium can be a tangible device that can retain and/or store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more particular examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card and/or network interface in one or more computing/processing devices can receive computer readable program instructions from the network and/or forward the computer readable program instructions for storage in a computer readable storage medium within the respective computing/processing device.

Computer readable program instructions for carrying out one or more operations of the one or more embodiments described herein can be assembler instructions, instruction-set-architecture (ISA) instructions, machine instructions, machine dependent instructions, microcode, firmware instructions, state-setting data, configuration data for integrated circuitry, and/or either source code or object code written in any combination of one or more programming languages, including an object oriented programming language such as Smalltalk, C++, or the like, and/or procedural programming languages, such as the "C" programming language and/or similar programming languages. The computer readable program instructions can execute entirely on the user's computer, partly on the user's computer, as a stand-alone software package, partly on the user's computer and partly on a remote computer and/or entirely on the remote computer and/or server. In the latter scenario, the remote computer can be connected to the user's computer through any type of network, including a local area network (LAN) and/or a wide area network (WAN), and/or the connection can be made to an external computer (for example, through the Internet using an Internet Service Provider). In one or more embodiments, electronic circuitry including, for example, one or more programmable logic circuitry, field-programmable gate arrays (FPGA) and/or programmable logic arrays (PLA) can execute the computer readable program instructions by utilizing state information of the computer readable program instructions to personalize the electronic circuitry, in order to perform one or more aspects of the one or more embodiments described herein.

Those skilled in the art will recognize that one or more embodiments described herein can or can be implemented in combination with one or more program modules. Generally, program modules can include routines, programs, components and/or data structures that can perform particular tasks and/or implement particular abstract data types. Moreover, the computer-implemented and/or system-implemented methods described herein can be practiced with other computer system configurations, including single-processor and/or multiprocessor computer systems, mini-computing devices, and/or mainframe computers, as well as computers, hand-held computing devices (e.g., PDA, phone), microprocessor-based and/or programmable consumer and/or industrial electronics, and/or the like.

The illustrated aspects can also be practiced in one or more distributed computing environments in which tasks can be performed by remote processing devices that are linked through a communications network. However, one or more, if not all aspects described herein can be practiced on one or more stand-alone computers.

In a distributed computing environment, program modules can be located in both local and remote memory storage devices. For example, in one or more embodiments, computer executable components can be executed from memory that can include and/or be comprised of one or more distributed memory units. As used herein, the term "memory" and "memory unit" are interchangeable. Further, one or more embodiments described herein can execute code of the computer executable components in a distributed manner, e.g., multiple processors combining and/or working cooperatively to execute code from one or more distributed memory units. As used herein, the term "memory" can encompass a single memory and/or memory unit at one location and/or multiple memories and/or memory units at one or more locations.

As used herein, the terms "component," "system," "platform," "interface," and the like, can refer to and/or can include a computer-related entity and/or an entity related to an operational machine with one or more specific functionalities. One or more such entities disclosed herein can be hardware, a combination of hardware and software, software, and/or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric and/or electronic circuitry, which can be operated by a software and/or firmware application executed by a processor. In such a case, the processor can be internal and/or external to the apparatus and/or can execute at least a part of the software and/or firmware application. As yet another example, a component can be an apparatus that provides specific functionality through electronic components without mechanical parts, wherein the electronic components can include a processor and/or other means to execute software and/or firmware that confers at least in part the functionality of the electronic components. In an aspect, a component can emulate an electronic component via a virtual machine, e.g., within a cloud computing system.

As used herein, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, and/or any combination thereof designed to perform the functions described herein. Further, one or more processors can exploit nano-scale architectures such as, but not limited to, molecular and/or quantum-dot based transistors, switches and/or gates, in order to optimize space usage and/or to enhance performance of user equipment. A processor can also be implemented as a combination of computing processing units.

As used herein, terms such as "store," "storage," "data store," "data storage," "database," and substantially any other information storage component relevant to operation and/or functionality of a component are utilized to refer to "memory components," entities embodied in a "memory," and/or components comprising a memory. Memory and/or memory components described herein can be volatile memory and/or nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in one or more forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and/or Rambus dynamic RAM (RDRAM). Additionally, the disclosed memory components of systems, system-implemented methods and/or computer-implemented methods described herein are intended to include, without being limited to including, these and/or any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is any aspect and/or design meant to preclude equivalent exemplary structures and/or techniques known to those of ordinary skill in the art.

The description of the one or more embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the one or more embodiments disclosed herein.

What is claimed is:

1. A vehicle, comprising:
   an inductive charging element;
   a signal component located relative to the inductive charging element for common movement with the inducting charging element, wherein the signal component receives signals from a ground coil assembly that is not part of the vehicle;
   a controller that determines positions of the inductive charging element relative to the target position based on time measurements of the signals;
   a guidance control system that controls movement of the vehicle towards the ground coil assembly until a position of the inducting charging element has reached a threshold distance from the ground coil assembly; and
   a motive device that, in response to the inducting charging element reaching the threshold distance from the ground coil assembly, controls movement of the inductive charging element and signal component, independent from movement of the vehicle, to position the inducting charging element in a defined position relative to the ground coil assembly.

2. The vehicle of claim 1, wherein the signal component transmits a wake signal to the ground coil assembly.

3. The vehicle of claim 1, wherein the time measurements are time of arrival measurements.

4. The vehicle of claim 1, wherein the time measurements are time of flight measurements.

5. The vehicle of claim 1, wherein the signal component is an ultrawideband antenna.

6. The vehicle of claim 1, wherein the received signals are reflected signals from transmitted signals sent by the signal component.

7. A method, comprising:
   receiving, by a signal component of a vehicle, signals from a ground coil assembly, wherein an inductive charging element of the vehicle is located relative to the signal component of the vehicle for common movement of the inductive charging element and the signal component;
   determining, by a controller of the vehicle, positions of the inductive charging element relative to the ground coil assembly based on time measurements of the signal;
   controlling, by the controller, movement of the vehicle towards the ground coil assembly until a position of the inducting charging element has reached a threshold distance from the ground coil assembly that is not part of the vehicle; and
   in response to the inducting charging element reaching the threshold distance from the ground coil assembly, controlling, by the controller, movement of the inductive charging element and signal component, independent from movement of the vehicle, to position the inducting charging element in a defined position relative to the ground coil assembly.

8. The method of claim 7, wherein the received signals are reflected signals from transmitted signals sent by the signal component.

9. The method of claim 7, further comprising:
   sending, by the system, a wake signal to the ground coil assembly based on a selectively determined minimum distance of the signal component from the ground coil assembly.

10. The method of claim 7, wherein the time measurements are time of arrival measurements.

11. The method of claim 7, wherein the time measurements are time of flight measurements.

12. The method of claim 7, further comprising:
    displaying, by the system, a symbolic representation of the inductive charging element relative to the ground coil assembly on a graphical user interface.

13. The method of claim 7, further comprising:
    pairing, by the system, the signal component being an ultrawideband (UWB) antenna with another signal component associated with the ground coil assembly, the other signal component being another UWB antenna, via a Bluetooth low energy connection.

14. The method of claim 7, wherein the received signals are transmitted signals from the ground coil assembly.

15. The vehicle of claim 1, wherein the received signals are transmitted signals from the ground coil assembly.

16. A non-transitory computer-readable medium having instructions stored thereon that, in response to execution, cause a vehicle comprising a processor to perform operations comprising:
- receive, by a signal component of a vehicle, signals from a ground coil assembly, wherein an inductive charging element of the vehicle is located relative to the signal component of the vehicle for common movement of the inductive charging element and the signal component;
- determine positions of the inductive charging element relative to the target position based on time measurements of the signals;
- control movement of the vehicle towards the ground coil assembly until a position of the inducting charging element has reached a threshold distance from the ground coil assembly that is not part of the vehicle; and
- in response to the inducting charging element reaching the threshold distance from the ground coil assembly, control movement of the inductive charging element and signal component, independent from movement of the vehicle, to position the inducting charging element in a defined position relative to the ground coil assembly.

17. The non-transitory computer-readable medium of claim 16, sending a wake signal to the ground coil assembly.

18. The non-transitory computer-readable medium of claim 16, wherein the time measurements are time of arrival measurements.

19. The non-transitory computer-readable medium of claim 16, wherein the time measurements are time of flight measurements.

20. The non-transitory computer-readable medium of claim 16, wherein the received signals are reflected signals from transmitted signals sent by the signal component.

* * * * *